US006195989B1

(12) United States Patent
Hall et al.

(10) Patent No.: US 6,195,989 B1

(45) Date of Patent: Mar. 6, 2001

(54) POWER CONTROL SYSTEM FOR A MACHINE

(75) Inventors: Lowell R. Hall, Elmwood; Mitchell J. McGowan, Groveland, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/304,675

(22) Filed: May 4, 1999

(51) Int. Cl.[7] .................................................... F16D 33/02

(52) U.S. Cl. ................................................ 60/329; 60/422

(58) Field of Search ............................ 60/422, 456, 421, 60/420, 329

(56) References Cited

U.S. PATENT DOCUMENTS 3,664,129 * 5/1972 Schwab ................................ 60/53 R
5,564,274 * 10/1996 Denbraber et al. .................... 60/329
5,832,729 * 11/1998 Reid et al. ............................. 60/421
5,946,911 * 9/1999 Buschur et al. ........................ 60/424

* cited by examiner

*Primary Examiner*—F. Daniel Lopez
*Assistant Examiner*—Thomas E. Lazo
(74) *Attorney, Agent, or Firm*—Haverstock, Garrett & Roberts; W. Bryan McPherson, III

(57) ABSTRACT

A power control system for a machine having an engine, a hydraulic system, a boom function, and a swing function is disclosed which comprises a sensor for determining the temperature of the engine, a sensor for determining the temperature of the hydraulic system, a cooling system associated with the engine, a cooling system associated with the hydraulic system, a controller connected to the sensors and the cooling systems, the controller for receiving the temperatures of the engine and the hydraulic system and for determining whether the temperatures are within acceptable ranges, the controller for detecting when a boom function and a swing function have been requested.

27 Claims, 5 Drawing Sheets

POWER CONTROL SYSTEM FOR A MACHINE

TECHNICAL FIELD

This invention relates generally to a power control system for a machine and more particularly to a power control system for a machine for determining when to divert power from one component within the machine to another component.

BACKGROUND ART

In present machines, such as hydraulic shovels or backhoes, one type of operation routinely employed is a digging operation. Such digging operations include filling a bucket with material, lifting the bucket up by use of a boom, and swinging the bucket toward a truck for dumping the material into the truck. In particular, in large mining environments, one measure of a machine's efficiency is how quickly the machine is capable of acquiring a load of material and then dumping the load into a truck. This is typically known as a cycle or cycle time. A majority of the cycle time consists of the swinging motion of the machine from the dig site to the truck and then back to the dig site. This swing motion can be slowed if a boom up request is made simultaneously with the swing request. Consequently, when both a boom request and a swing request occur together the cycle time is reduced and the productivity of the machine falls.

The boom up and the swing are operated by hydraulic pumps controlled by a hydraulic system. The machine further typically includes an engine cooling fan and a hydraulic cooling fan which are used to ensure that the engine and the hydraulic system are operated within acceptable temperature ranges. The engine cooling fan and the hydraulic cooling fan are driven by hydraulic motors which draw their power from the same hydraulic circuits as that as the hydraulic pumps. There is a considerable amount of power required to drive the cooling fans during operation of the machine. Additionally, operation of these cooling fans at the same time a boom up request and a swing request occur further reduces the productivity of the machine.

In view of the above, it would be desirable to provide a power control system which is capable of determining when both a boom up request and a swing request are occurring to thereby divert power from the cooling fans within the machine to increase the productivity of the machine. Further, it would be advantageous to provide a power control system for a machine which controls operation of the cooling fans within the machine to provide more power to the pumps associated with the boom mechanism and the swing mechanism.

Accordingly, the present invention is directed to overcoming one or more of the problems as set forth above.

DISCLOSURE OF THE INVENTION

In one embodiment of the present invention, a power control system for a machine having an engine, a hydraulic system, a boom function, and a swing function comprises a sensor for determining the temperature of the engine, a sensor for determining the temperature of the hydraulic system, a cooling system associated with the engine, a cooling system associated with the hydraulic system, a controller connected to the sensors and the cooling systems, the controller for receiving the temperatures of the engine and the hydraulic system and for determining whether the temperatures are within acceptable ranges, the controller for detecting when a boom function and a swing function have been requested.

Another embodiment of the present invention is a power control system for a machine having an engine, a hydraulic system, a boom, a swing, a boom pump and a swing pump with each of the pumps being connected to the hydraulic system, with the power control system comprising an engine cooling system, a hydraulic cooling system, and a controller connected to the engine, the hydraulic system, the boom, the swing, and the cooling systems, the controller for sensing the temperatures of the engine and the hydraulic system and for determining whether the temperatures are within acceptable ranges, the controller for detecting when the boom and the swing have been actuated.

In another embodiment of the present invention a power control system for a machine having an engine, a hydraulic system, a boom, and a swing comprises a sensor for determining the temperature of the engine, a sensor for determining the temperature of the hydraulic system, an engine cooling system, a hydraulic cooling system, and a controller connected to the boom, the swing, the sensors and the cooling systems, the controller for receiving the temperatures of the engine and the hydraulic system from the sensors and for determining whether the temperatures are within acceptable ranges, the controller for detecting when the boom and the swing have been actuated.

BEST MODE FOR CARRYING OUT THE INVENTION

Figure 1:
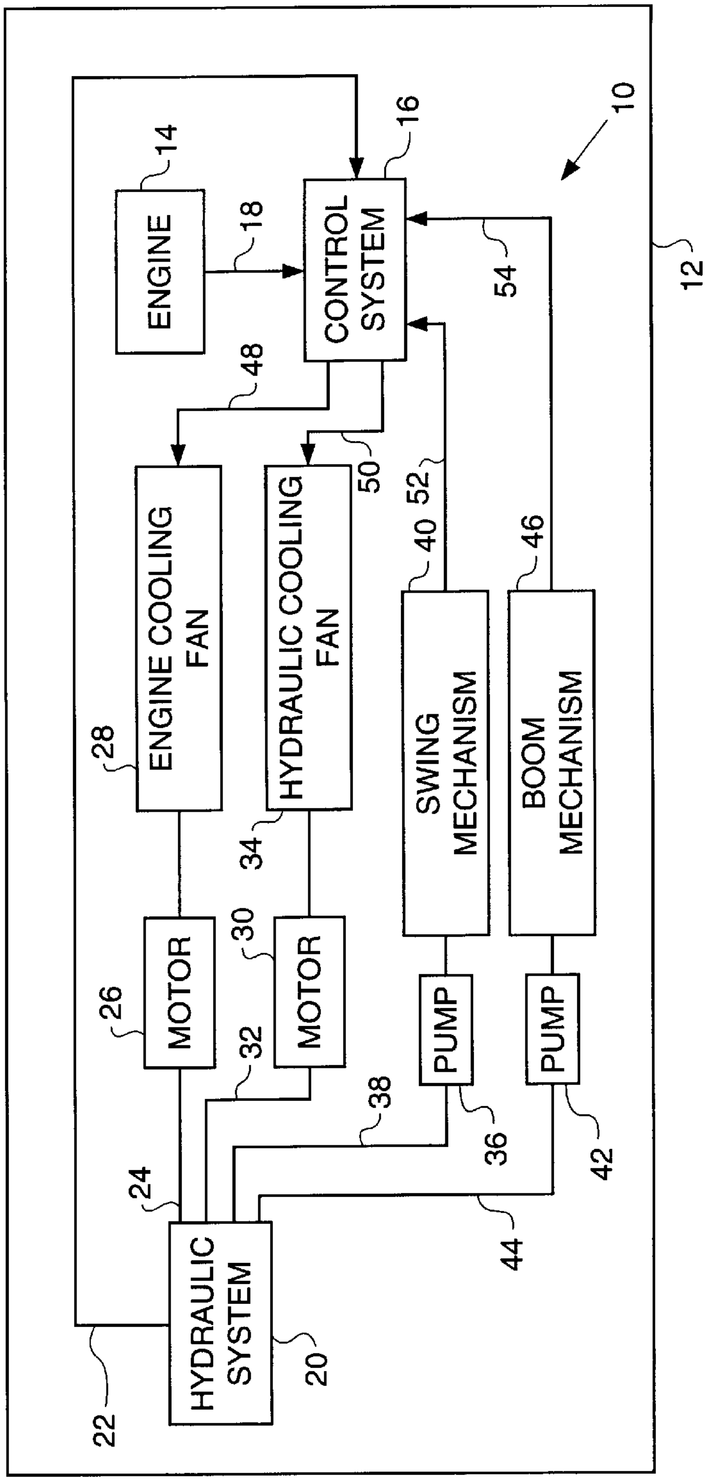
FIG. 1 is a block diagram of a power control system for a machine constructed according to the present invention.

Referring now to the drawings, FIG. 1 illustrates a power control system 10 for a machine 12 constructed according to the present invention. The machine 12 may be, for purposes of example, a hydraulic shovel or backhoe. The machine 12 includes an engine 14, a control system 16 connected to the engine 14 by a lead or leads 18, and a hydraulic system 20 connected to the control system 16 by a lead or leads 22. The hydraulic system 20 is connected by a hydraulic line 24 to a first motor 26 with the first motor 26 being used to drive an engine cooling fan 28. The hydraulic system 20 is connected to a second motor 30 by a hydraulic line 32 with the second motor 30 being used to drive a hydraulic cooling fan 34. The hydraulic system 20 is further connected to a swing pump 36 by a hydraulic line 38 with the swing pump 36 adapted to operate a swing mechanism 40 associated with the machine 12. The hydraulic system 20 is connected to a boom mechanism 46 which is associated with the machine 12.

The control system 16 is connected to the engine cooling fan 28 by an electrical lead 48. A signal from the control system 16 to the engine cooling fan 28 may be provided over the lead 48 to the control operation of the engine cooling fan 28. The hydraulic cooling fan 34 is connected to the control system 16 via a lead 50. The control system 16 may control operation of the hydraulic cooling fan 34 by sending an appropriate signal over the lead 50. The control system 16 is further connected to the swing mechanism 40 over an electrical connection 52 for the control system 16 to know when the swing mechanism 40 is being used whenever a signal is transmitted over the electrical connection 52 from the swing mechanism 40. The boom mechanism 46 is connected to the control system 16 by a wire 54 for a signal to be sent over the wire 54 from the boom mechanism 46 to the control system 16. The transmitted signal will inform the control system 16 that the boom mechanism 46 is being operated. The control system 16 may include a microprocessor, a microcontroller, or other similar electrical circuitry which is capable of controlling and monitoring the operation of the machine 12.

The hydraulic system 20 provides hydraulic fluid through the various hydraulic lines 24, 32, 38, and 44 to power the motors 26 and 30 and the swing and boom mechanisms 40, 46. The engine cooling fan 28 is used to cool the engine 14 during operation and to keep the temperature of the engine 14 within acceptable operating temperatures or ranges. The hydraulic cooling fan 34 is employed to cool the hydraulic fluid or oil within the machine 12. The hydraulic fluid needs to be kept within desirable operating temperatures and the hydraulic cooling fan 34 may be used to ensure that this happens. The swing pump 36 is used to move an implement, such as a shovel or a backhoe, associated with the machine 12. Additionally, the boom pump 42 is employed to actuate the boom mechanism 46.

During operation of the machine 12, an operator will be able to operate both the boom mechanism 46 and the swing mechanism 40 of the machine 12 in order to excavate material from a site. Whenever an operator utilizes both the swing mechanism 40 and the boom mechanism 46 it may be desirable to limit or reduce the power which is being applied to the first motor 26 and the second motor 30. The control system 16 is capable of controlling the engine cooling fan 28 and the hydraulic cooling fan 34 whenever it is determined that the boom mechanism 46 and the swing mechanism 40 have been actuated. The control system 16 may send signals over the leads 48 and 50 to thereby control the engine cooling fan 28 and the hydraulic cooling fan 34, respectively. Reducing power to the engine cooling fan 28, the hydraulic cooling fan 34, or both, allows more power to be provided by the hydraulic system 20 for the swing mechanism 40 and the boom mechanism 46.

There are other components which are or may be part of the machine 12 which have not been shown or discussed. For example, the machine 12 may also include a transmission system, left and right track rollers or an undercarriage, and a cab section for an operator. Although not shown or discussed, the control system 16 may control and monitor these other components of the machine 12.

Figure 2:
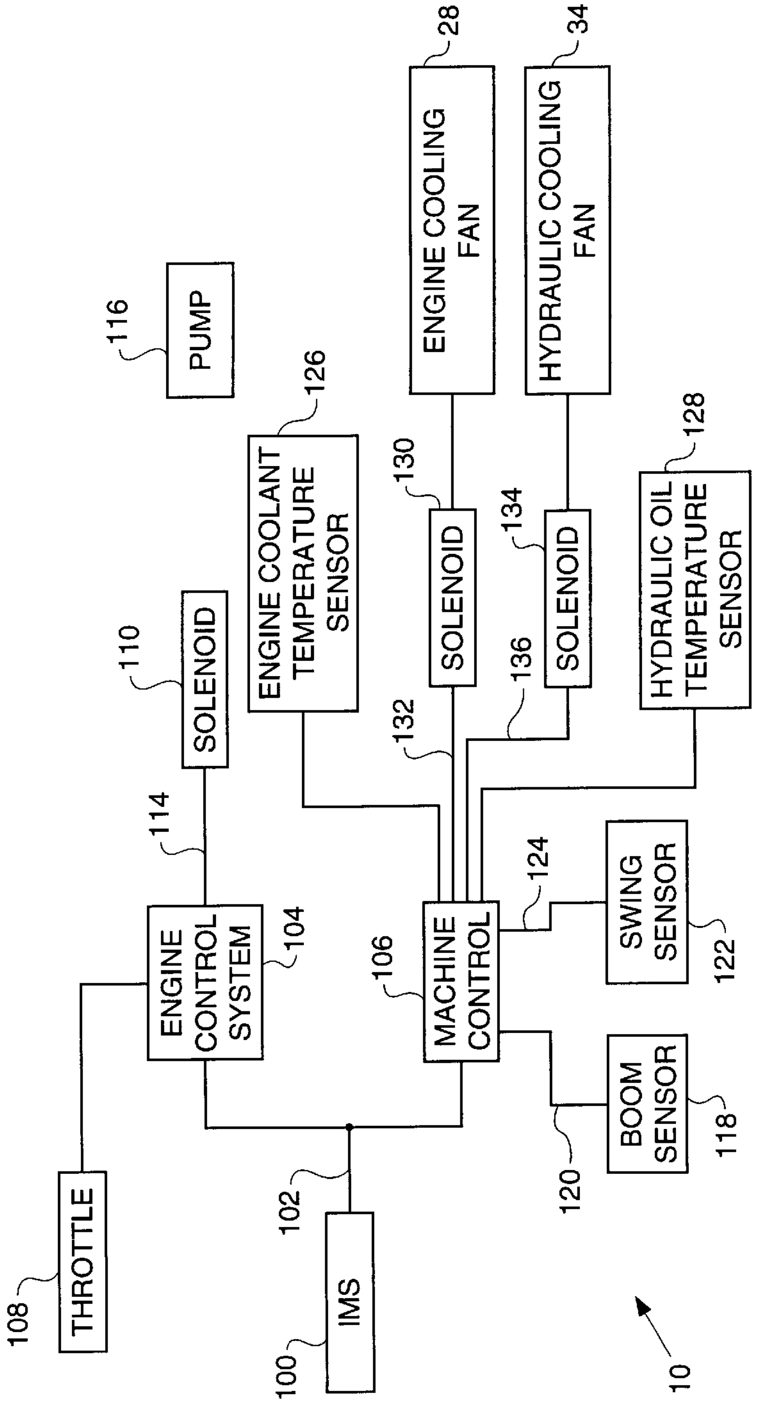
FIG. 2 is another block diagram of the power control system for a machine constructed according to the present invention.

Referring now to FIG. 2, a block diagram of the power control system 10 is illustrated in further detail. The power control system 10 may include an information monitoring system (IMS) 100 which is used to monitor vital functions of the machine 12. The IMS 100 may consist of a microprocessor, a microcontroller, or other suitable processing system for monitoring and for controlling operation of the machine 12. The IMS 100 is connected by a data bus 102 to an engine control system 104 and a machine control 106. A throttle switch 108 is connected to the engine control system 104. A pump control 110 is also connected to the engine control system 104 by a lead 114. The solenoid 110 is associated with or controls a proportional implement pump 116.

A boom switch or sensor 118 is connected to the machine control 106 for a signal to be sent over a wire 120 from the boom sensor 118 to the machine control 106 to inform the machine control 106 that the boom mechanism 46 is being operated. A swing switch or sensor 122 is connected to the machine control 106 via a lead 124. The swing sensor 122 provides a signal to the machine control 106 indicative of the swing mechanism 40 being actuated or requested. An engine coolant temperature sensor 126 is connected to the machine control 106 for monitoring the temperature of the engine 14 (FIG. 1) and for providing the temperature to the machine control 106 for processing. A hydraulic oil temperature sensor 128 is also connected to the machine control 106. The hydraulic oil temperature sensor 128 is used to monitor the temperature of the hydraulic oil or fluid within the hydraulic system 20 (FIG. 1). The temperature of the hydraulic oil is provided to the machine control 106 by the sensor 128. A solenoid 130 associated with the engine cooling fan 28 is connected to the machine control 106 by a lead 132. Signals may be provided over the lead 132 to the solenoid 130 to thereby control operation of the engine cooling fan 28. A solenoid 134 which is used to control operation of the hydraulic cooling fan 34 is connected to the machine control 106 by a wire 136. The machine control 106 may transmit signals over the wire 136 to actuate the solenoid 134 which in turn controls operation of the hydraulic cooling fan 34. The solenoids 130 and 134 may be proportional solenoids.

Figure 3:
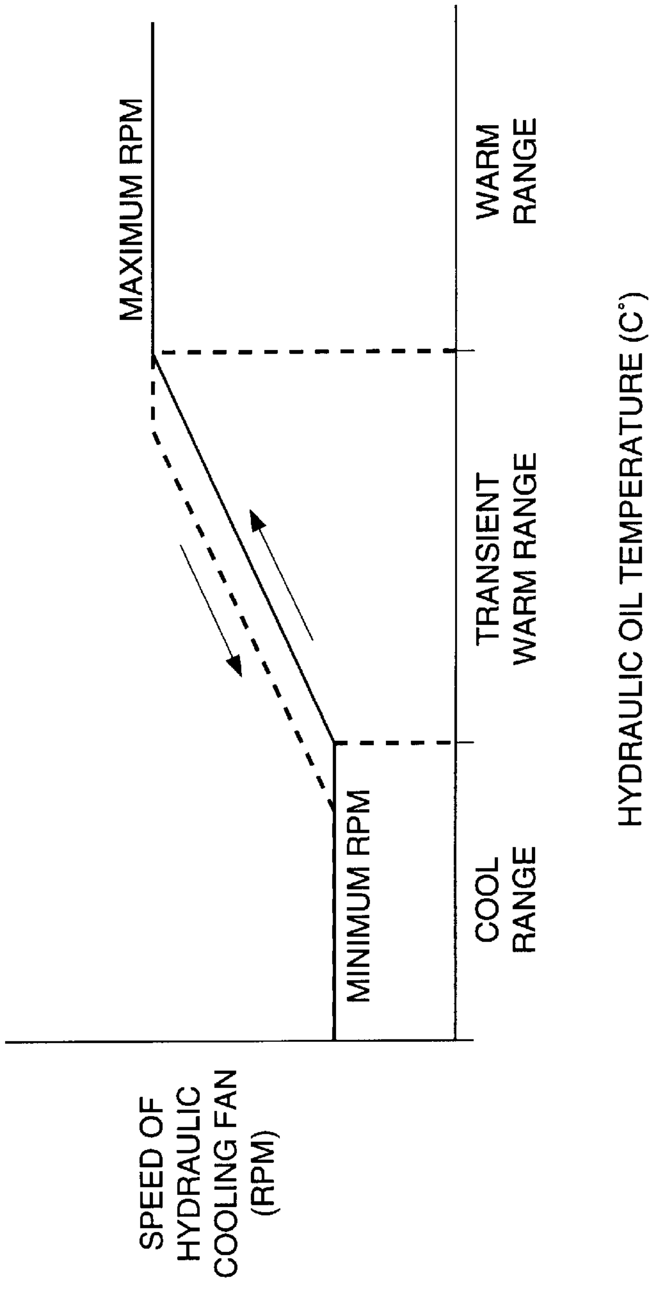
FIG. 3 is a graph of acceptable operating conditions for a hydraulic system within the power control system.

The power control system 10 may be operated in the following manner. The machine control 106 continuously monitors the boom sensor 118, the swing sensor 122, the engine coolant temperature sensor 126, and the hydraulic oil temperature sensor 128. The hydraulic cooling fan 34 is controlled by the solenoid 134, which is controlled by the machine control 106. The operation of the hydraulic cooling fan 34 may be controlled in response to whether the swing and/or boom functions are being requested by an operator. In one embodiment the temperature range may be divided into a cool range, a transient warm range, and a warm range, as illustrated in FIG. 3. When the hydraulic oil temperature sensor 128 determines that the hydraulic oil temperature is within the cool range the hydraulic cooling fan 34 will be set to a minimum fan speed. If the temperature sensed by the hydraulic oil temperature sensor 128 is within the transient warm range then the fan speed will ramp up or increase according to the graph or function illustrated in FIG. 3. Within the warm range the fan 34 operates at the maximum fan speed.

With reference again to FIG. 3, a graph of the speed at which the hydraulic cooling fan 34 is turning or operating versus the temperature of the hydraulic oil is shown. In particular, the minimum fan speed, represented in RPMs (revolutions per minute), is for temperatures within the cool range. Within the transient warm range the speed of the fan 34 generally increases up to the maximum speed. Within the warm range the speed of the fan 34 will be at the maximum speed. Additionally, as shown in FIG. 3, there is a hysteresis associated with the hydraulic oil temperature as the temperature decreases which is used to prevent hunting (i.e., to prevent turning the fan 34 on and off due to minor fluctuations in the temperature).

Continuing with the operation of the power control system 10, when both swing and boom functions are requested by an operator of the machine 12, which corresponds to signals being transmitted from the boom sensor 118 and the swing sensor 122 then the solenoid 134 will be operated to either reduce the speed of the fan 34 or to stop the fan 34. Additionally, the fan 34 may be stopped if the temperature is within the cool range. This will allow for extra hydraulic power to be available for the boom pump 42 and the swing pump 36.

There is also provided within the power control system 10 an automatic thermal override in case the temperature of the hydraulic oil becomes too warm. In this case, power should always be supplied to the solenoid 134 in an attempt to cool the hydraulic system 20. For example, the machine control 106 could be programmed to determine if the temperature of the hydraulic oil is too warm. If the temperature is too warm the operation of the solenoid 134, as discussed above, will be overridden until the hydraulic oil temperature sensor 128 detects that the temperature is back within an acceptable range. This will be the condition of operation of the solenoid 134 regardless of whether a swing and boom function has been requested.

The power control system 10 also functions to monitor the temperature of the engine 14 by use of the engine coolant temperature sensor 126. In particular, when no swing and boom functions are being requested by an operator of the machine 12, the engine cooling fan 28 is controlled by the solenoid 130 which modulates the speed of the engine cooling fan 28. When the engine coolant temperature sensor 126 determines that the engine coolant temperature is in the cool range the engine cooling fan 28 will be set to a minimum fan. If the temperature sensed by the engine coolant temperature sensor 126 is in the warm transient range, then the fan speed will ramp up or increase according to the graph or function illustrated in FIG. 4. In the warm range and above the fan 28 operates at the maximum fan speed.

Figure 4:
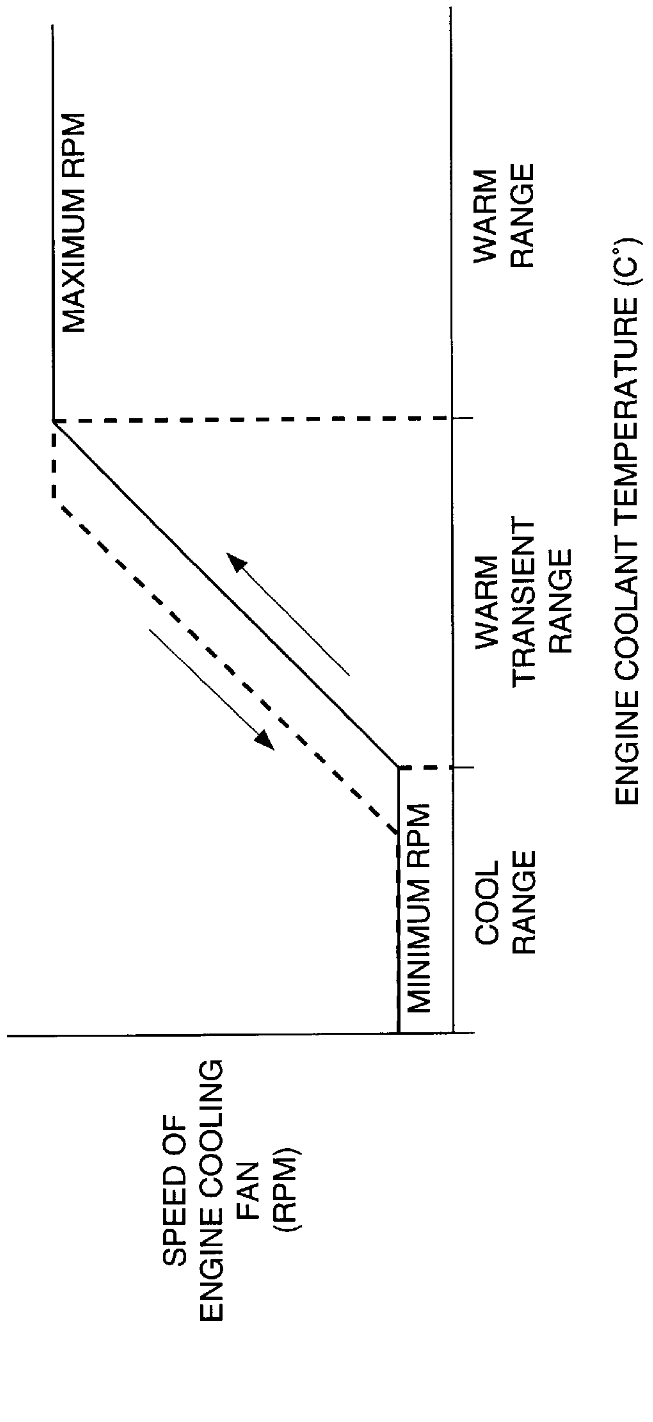
FIG. 4 is a graph of acceptable operation parameters for an engine within the power control system.

Referring to FIG. 4, a graph of the speed at which the engine cooling fan 28 is rotating versus the temperature of the engine coolant is shown. As illustrated in FIG. 4, there is a hysteresis associated with the engine coolant temperature as the temperature of the coolant decreases.

When the boom mechanism 46 and the swing mechanism 40 are both requested by an operator the power control system 10 operates in the following way. Signals are sent from the boom sensor 118 and the swing sensor 122 to the machine control 106. The machine control 106 controls operation of the solenoid 130 to either reduce or stop the speed of the fan 28. The speed of the fan 28 may be reduced according to the temperature sensed by the sensor 126. This will provide extra hydraulic power to be available for the boom pump 42 and the swing pump 36.

The power control system 10 also provides for automatic thermal override in case the temperature of the engine coolant becomes too hot and power should always be supplied to the solenoid 130. For example, the machine control 106 could be programmed to determine if the temperature of the engine coolant is too hot. If this is the case, the operation of the solenoid 130 will be overridden until the engine coolant temperature sensor 126 detects that the temperature is back within an acceptable range. This will be the case of operation of the solenoid 130 regardless of whether the swing and the boom functions have been requested.

Figure 5:
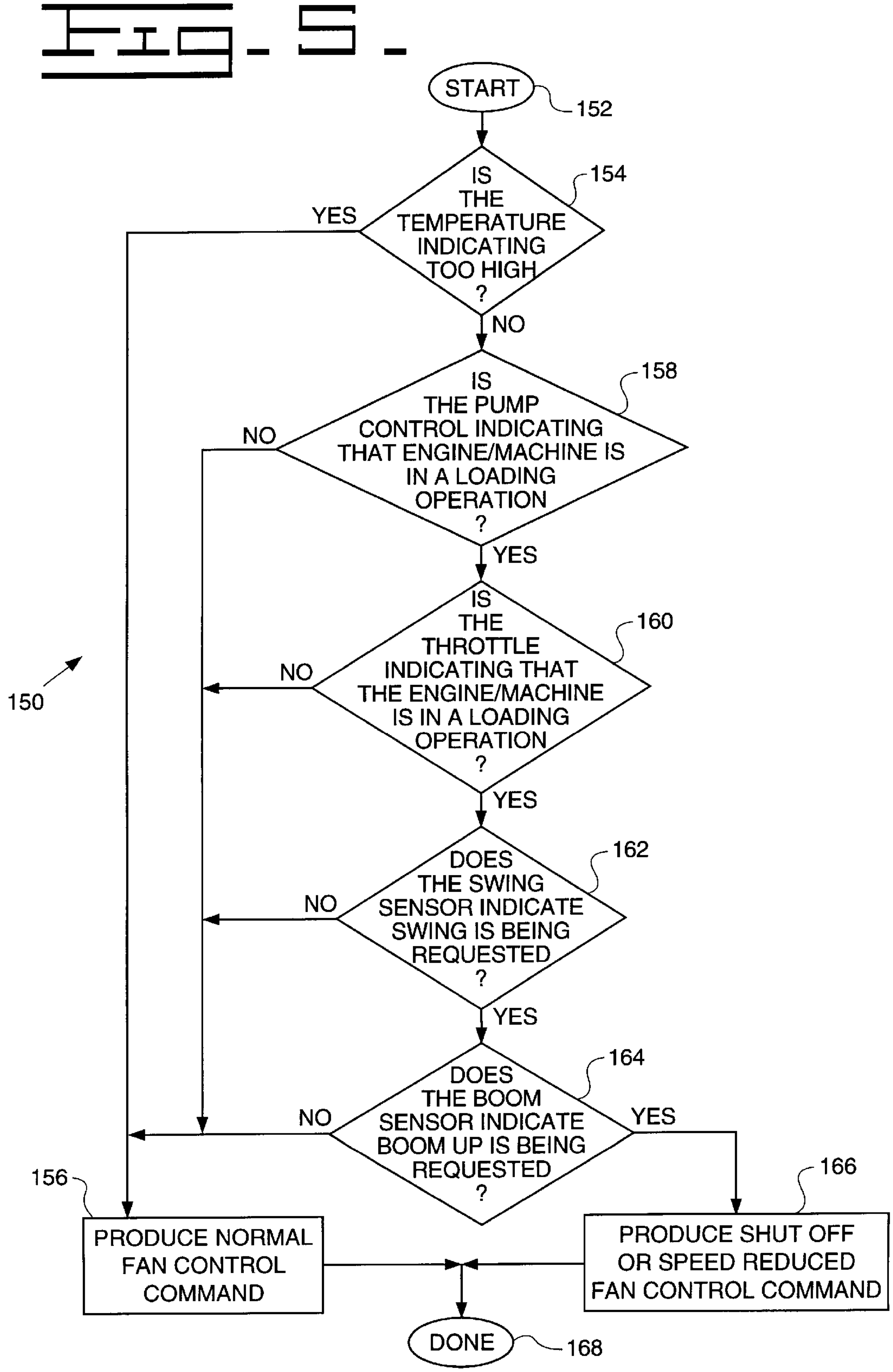
FIG. 5 is a flowchart diagram of a method of operation of the power control system for a machine.

FIG. 5 shows a flow chart 150 of the operation of the power control system 10. In a step 152 the program which may be stored in either the control system 16 or the machine control 106 is initiated at a start step. The program then continues to a step 154 where it is determined whether the temperatures sensed by the engine coolant temperature sensor 126 and the hydraulic oil temperature 128 are too high. If the temperatures are too high then control of the program passes to a step 156 where a normal fan control command is provided to the solenoids 130 and 134. When it is decided in the step 154 that the temperatures are within acceptable limits the program continues to a step 158 to determine if the pump control solenoid 110 is indicating that the machine 12 is in a loading operation. An answer of NO will cause the program to branch to the step 156. If it is determined in the step 158 that the machine 12 is in a loading operation then the program continues to a step 160.

In the step 160 the program determines whether the throttle 108 is indicating that the machine 12 is in a loading operation. In an alternative embodiment, either the pump control solenoid 110 or the throttle 108 may be monitored to determine if the engine is under a heavy load without checking both the solenoid 110 or the throttle 108. If the throttle 108 is not indicating that the machine 12 is in a loading operation, then the program will branch off to the step 156. If the throttle 108 is indicating that the machine 12 is in a loading operation, then control of the program passes on to a step 162. A determination concerning whether the swing sensor 122 is indicating that a swing operation is being requested is made in the step 162. When no swing operation is being requested the program branches to the step 156. However, when a swing operation is being requested control of the program continues on to a step 164 to check for the presence of a signal from the boom sensor 118 which is indicative of a boom operation being requested. If, in the step 164, it is determined that no boom operation is being requested then the program will branch out to the step 156. When a boom operation is being requested the flow of the program will proceed to a step 166. In the step 166 the solenoids 130 and 134 will be operated to shut off or reduce the speed of one or both of the fans 28 and 34. In this manner more power will be provided to the hydraulic system 20 which in turn provides more power to the swing pump 36 and the boom pump 42. After the step 166 the program will continue to a step 168 which completes the flow chart 150. Additionally, once the step 156 is reached and the normal operation command is generated control of the program will continue to the step 168. It is to be understood that the flow chart 150 is only a portion of the program which controls the machine 12. For example, the program which is depicted in FIG. 5 may be a subroutine of a main program with the subroutine being executed in every loop or pass of the main program. Further, the subroutine and the main program may be stored in memory in either the control system 16 or the machine control 106.

INDUSTRIAL APPLICABILITY

The present invention is applicable in situations where machines can improve productivity and performance by diverting power from the cooling fans to some other hydraulic functions. The present invention is useful in machines which have cooling fans and a controller which controls the operation of the cooling fans in order for power to be used by other components within the machine.

Other aspects, objects and advantages of the present invention can be obtained from a study of the drawings, the disclosure and the appended claims.

What is claimed is:

1. A power control system for a machine having an engine, a hydraulic system, a boom function, and a swing function, the system comprising a sensor for determining the temperature of the engine, a sensor for determining the temperature of the hydraulic system, a cooling system associated with the engine, a cooling system associated with the hydraulic system, a controller connected to the sensors and the cooling systems, the controller for receiving the temperatures of the engine and the hydraulic system and for determining whether the temperatures are within acceptable ranges, the controller for detecting when a boom function and a swing function have been requested and for controlling the operation of the cooling systems in response to said request detection and said determination of whether the temperatures are within an acceptable range.

2. The power control system of claim 1 wherein the engine cooling system comprises a fan connected to the controller and the controller is capable of reducing the speed of the fan in response to the boom function and the swing function being requested.

3. The power control system of claim 1 wherein the hydraulic cooling system comprises a fan connected to the controller and the controller is capable of reducing the speed of the fan in response to the boom function and the swing function being requested.

4. The power control system of claim 1 wherein the engine cooling system comprises a solenoid connected to a fan with the solenoid also being connected to the controller and the controller actuates the solenoid to reduce the speed of the fan in response to the boom function and the swing function being requested.

5. The power control system of claim 1 wherein the hydraulic cooling system comprises a solenoid connected to a fan with the solenoid also being connected to the controller and the controller actuates the solenoid to reduce the speed of the fan in response to the boom function and the swing function being requested.

6. The power control system of claim 1 wherein the hydraulic cooling system comprises a fan connected to the controller and the engine cooling system comprises a fan connected to the controller and the controller determines whether to reduce the speed of at least one of the fans in response to the boom function and the swing function being requested.

7. The power control system of claim 6, wherein the controller is further adapted to increase the speed of at least one of the engine cooling system fan and the hydraulic cooling system fan in response to at least one of the engine temperature and the hydraulic system temperature increasing.

8. The power control system of claim 1 further comprising a pump control solenoid and a throttle connected to the controller, the pump control solenoid and the throttle for indicating the load on the engine, the hydraulic cooling system comprises a fan connected to the controller and the engine cooling system comprises a fan connected to the controller and the controller determines whether to reduce the speed of at least one of the fans in response to the boom function and the swing function being requested, and the load on the engine.

9. The power control system of claim 1 wherein the controller disables both of the cooling systems if the temperature of the engine and the hydraulic system are each below a predetermined temperature.

10. The power control system of claim 1 wherein the controller further comprises a thermal override which inhibits the controller from reducing power provided to the cooling systems.

11. A power control system for a machine having an engine, a hydraulic system, a boom, a swing, a boom pump and a swing pump with each of the pumps being connected to the hydraulic system, the power control system comprising an engine cooling system, a hydraulic cooling system, and a controller connected to the engine, the hydraulic system, the boom, the swing, and the cooling systems, the engine cooling system including a fan, the hydraulic cooling system including a fan, the controller for sensing the temperatures of the engine and the hydraulic system detecting when the boom and the swing have been actuated, and increasing the speed of at least one of the engine cooling system fan and the hydraulic cooling system fan in response to at least one of the engine temperature and the hydraulic system temperature increasing, and the boom and the swing are being actuated.

12. The power control system of claim 11 wherein the engine cooling system comprises a fan connected to the controller and the controller is capable of reducing the speed of the fan in response to the boom and the swing being actuated.

13. The power control system of claim 11 wherein the hydraulic cooling system comprises a fan connected to the controller and the controller is capable of reducing the speed of the fan in response to the boom and the swing being actuated.

14. The power control system of claim 11 wherein the engine cooling system comprises a solenoid connected to a fan with the solenoid also being connected to the controller and the controller actuates the solenoid to reduce the speed of the fan.

15. The power control system of claim 11 wherein the hydraulic cooling system comprises a solenoid connected to a fan with the solenoid also being connected to the controller and the controller actuates the solenoid to reduce the speed of the fan.

16. The power control system of claim 11 wherein the controller disables both of the cooling systems if the temperatures of the engine and the hydraulic system are each below a predetermined temperature.

17. The power control system of claim 11 wherein the controller further comprises a thermal override which inhibits the controller from reducing power provided to the cooling systems.

18. A power control system for a machine having an engine, a hydraulic system, a boom, and a swing, the system comprising a sensor for determining the temperature of the engine, a sensor for determining the temperature of the hydraulic system, an engine cooling system, a hydraulic cooling system, and a controller connected to the boom, the swing, the sensors and the cooling systems, the controller for receiving the temperatures of the engine and the hydraulic system from the sensors detecting when the boom and the swing have been actuated and increasing the speed of at least one of the engine cooling system fan and the hydraulic cooling system fan in response to at least one of the engine temperature and the hydraulic system temperature increasing, and the boom and the swing are being actuated.

19. The power control system of claim 18 wherein the controller further comprises a thermal override which inhibits the controller from reducing power provided to the cooling systems.

20. The power control system of claim 18 wherein the controller further disables both of the cooling systems if the temperatures of the engine and the hydraulic system are each below a predetermined temperature.

21. The power control system of claim 18 wherein the controller only reduces the power to the cooling systems only when the temperatures of the engine and the hydraulic system are within a predetermined range.

22. The power control system of claim 18 wherein the engine cooling system comprises a fan connected to the controller and the controller is capable of reducing the speed of the fan.

23. The power control system of claim 18 wherein the hydraulic cooling system comprises a fan connected to the controller and the controller is capable of reducing the speed of the fan.

24. A method of controlling a power control system for a machine having an engine and an associated engine temperature sensor, a hydraulic system connected to the engine and having an associated hydraulic system temperature sensor, a boom function, a swing function, an engine cooling fan connected to the hydraulic system, a hydraulic cooling fan connected to the hydraulic system, a controller connected to said engine, said hydraulic system, said boom function, said swing function, said engine cooling fan, and said hydraulic cooling fan, comprising the steps of:

sensing a temperature of said engine;

sensing a temperature of said hydraulic system;

detecting an actuation of said boom function;

detecting an actuation of said swing function; and increasing a speed of one of said engine cooling fan and said hydraulic cooling fan in response to one of said engine temperature and said hydraulic system temperature increasing, and said detected boom function and said swing function actuation.

25. A method, as set forth in claim 24, wherein the step of increasing a speed of one of said engine cooling fan and said hydraulic cooling fan includes the step of increasing the speed of said engine cooling fan when said engine temperature exceeds an engine temperature threshold.

26. A method, as set forth in claim 25, wherein the step of increasing a speed of one of said engine cooling fan and said hydraulic cooling fan includes the step of increasing the speed of said hydraulic cooling fan when said engine temperature exceeds an hydraulic system temperature threshold.

27. A method, as set forth in claim 26, further including the steps of:

reducing a speed of at least one of said engine cooling fan and said hydraulic cooling fan in response to said detected boom function and said swing function actuation and engine temperature being less than said engine temperature threshold, and said hydraulic system temperature being less than said hydraulic system temperature threshold.

* * * * *